(12) United States Patent
Becker et al.

(10) Patent No.: US 7,056,848 B2
(45) Date of Patent: Jun. 6, 2006

(54) NONPOROUS KEATITE GLASS CERAMIC SUPPORT PLATE FOR TRANSPORTING PRODUCTS DURING HEAT TREATMENT, METHOD OF MAKING SAME AND METHOD OF TRANSPORTING PRODUCTS THEREWITH

(75) Inventors: Otmar Becker, Langen (DE); Bernd Ruedinger, Mainz (DE); Gerhard Hahn, Allenfeld (DE); Michael Bug, Mühltal (DE); Andreas Schminke, Weiterstadt (DE); Fritz Schroeder, Ingelheim (DE); Klaus Schönberger, Mainz (DE); Erich Rodek, Mainz (DE); Friedrich Siebers, Nierstein (DE); Rainer Best, Albig (DE)

(73) Assignee: Schott AG, Mainz (DE)

( * ) Notice: Subject to any disclaimer, the term of this patent is extended or adjusted under 35 U.S.C. 154(b) by 185 days.

(21) Appl. No.: 10/481,551

(22) PCT Filed: Jun. 21, 2002

(86) PCT No.: PCT/EP02/06866

§ 371 (c)(1),
(2), (4) Date: Dec. 19, 2003

(87) PCT Pub. No.: WO03/000610

PCT Pub. Date: Jan. 3, 2003

(65) Prior Publication Data

US 2004/0132602 A1    Jul. 8, 2004

(30) Foreign Application Priority Data

Jun. 23, 2001 (DE) .................. 101 30 440

Jun. 15, 2002 (DE) .................. 102 26 815

(51) Int. Cl.
*C03C 10/14* (2006.01)
*F27D 5/00* (2006.01)

(52) U.S. Cl. ............... 501/4; 65/33.1; 432/258

(58) Field of Classification Search ............... 501/4, 501/7; 65/33.1, 33.7, 33.8; 432/253–259
See application file for complete search history.

(56) References Cited

U.S. PATENT DOCUMENTS

| 4,011,091 A | * | 3/1977 | McCollister ............... 501/4 |
| 4,033,775 A | * | 7/1977 | Grossman .................. 501/5 |
| 4,187,115 A | | 2/1980 | Reade |
| 5,446,008 A | | 8/1995 | Krolla |
| 5,895,767 A | * | 4/1999 | Yamaguchi et al. ........ 501/7 |
| 6,413,906 B1 | * | 7/2002 | Shimatani et al. ......... 501/4 |

FOREIGN PATENT DOCUMENTS

| EP | 0 220 333 A1 | 5/1987 |
| EP | 1 074 520 A | 2/2001 |
| GB | 1 534 228 A | 11/1978 |

OTHER PUBLICATIONS

Patent Abstracts of Japan 05339021 A, Dec. 21, 1993.

* cited by examiner

*Primary Examiner*—Karl Group
(74) *Attorney, Agent, or Firm*—Michael J. Striker

(57) ABSTRACT

The support plate for transporting products during thermal treatment at firing temperatures is a nonporous keatite glass ceramic supporting member without a glassy surface layer. It has a nubby structure on an underside thereof and preferably C-shaped rounded edges. A method of making the keatite glass ceramic supporting member is described.

16 Claims, No Drawings

NONPOROUS KEATITE GLASS CERAMIC SUPPORT PLATE FOR TRANSPORTING PRODUCTS DURING HEAT TREATMENT, METHOD OF MAKING SAME AND METHOD OF TRANSPORTING PRODUCTS THEREWITH

BACKGROUND OF THE INVENTION

The invention relates to a firing aid for the thermal treatment of products consisting of different materials, at firing temperatures of up to 1100° C.

The invention furthermore relates to the production of such a firing aid.

In the thermal treatment of products consisting of different materials at firing temperatures, that is, at very high temperatures of up to 1100° C., and in particular in firing ceramics such as bricks, tiles and other ceramic articles, or in converting starting glasses into glass ceramics, support plates are needed for transporting the products to be fired during the thermal treatment; these are known as firing aids. Stringent demands both thermally and mechanically are made of these firing aids. In particular, they must resist the very high firing temperatures, should have sufficient resistance to temperature shock, also known as spalling resistance, and should have only slight interaction with the product to be fired, or in other words should in particular not give up any particles or cause any scratches or adhesion.

These stringent demands cannot be met, or can be met only with severe limitations, by commercially available material (cordierite, quartz material, Si/SiC).

The essential limitations are the following:
- cordierite and Si/SiC cannot be furnished in large enough sizes (such as 160 mm×900 mm);
- cordierite is porous and tends to give up particles;
- cordierite and Si/SiC support plates can reduce the impact strength of glass ceramic ceramicized on them very sharply;
- the low spalling resistance of cordierite and Si/SiC, particularly in relatively large sizes, drastically reduce the heating and cooling rates attainable;
- the limited mechanical strength of cordierite and (sintered) quartz material, with large sizes, does not permit thicknesses of less than 12 mm and thus allows only poor energy utilization in firing processes;
- quartz material, at usage temperatures>1000° C., tends to form local cristobalite, which is associated with disruptions (dents, clamshell defects) in the surface smoothness];
- for cordierite, the manufacturer generally guarantees only a limited number of firing operations (<500).

SUMMARY OF THE INVENTION

It is an object of the present invention to provide a firing aid that can be used for a greater number of thermal treatments of products at temperatures in a range around 1100° C. than prior art firing aids.

It is another object of the present invention to provide a support plate for transporting products during thermal treatment at temperatures in a range around 1100° C. that can be used for a greater number of thermal treatments of products than prior art support plates, that exhibits practically no mechanical interactions with the product to be thermally treated, especially no adherence effects, and that can be comparatively thin, even in large sizes.

It is a further object of the present invention to provide a method of transporting products during thermal treatment at temperatures in a range around 1100° C. using the support plate according to the invention.

It is an additional object of the present invention to provide a method of making the support plates for transporting products during thermal treatment so that they do not have a glassy surface layer.

With the firing aid for the thermal treatment of products consisting of different materials at firing temperatures as defined at the outset, this object is attained according to the invention in that the firing aid comprises a nonporous glass ceramic, in the form of a keatite glass ceramic without a glasslike surface layer.

Furnishing a keatite glass ceramic without a glasslike surface layer as a firing aid for the thermal treatment, particularly for firing different materials at temperatures of up to 1100° C., has the following advantages:

The firing aid
- has no pores and does not give off any particles, or in other words does not leave any "imprints" behind, and makes good impact strength of LAS glass ceramic ceramicized on it possible;
- does not tend to form surface cracks;
- can be used in large sizes (such as 1600×900 mm$^2$) and with small thicknesses (such as 4 mm); that is, even at large sizes with slight thicknesses, it still has an adequate mechanical strength to achieve efficient energy utilization with it. When shipped on rollers in a roller-type furnace, it proves to be advantageous if at least one side of the firing aid, preferably the underside, has a structured and preferably nubby surface;
- has a good spalling resistance (500 to 800° C.) and therefore even at large sizes makes higher heating and cooling rates possible compared to cordierite or Si/SiC;
- in use in roller-type furnaces as well, compared to cordierite it makes more than twice the number of temperature cycles possible;
- even in relatively long-term use, does not exhibit any changes in the surface smoothness from clamshell defects or the development of dents;
- because of its special surface properties, makes a significant reduction in the interaction between the product to be treated and the aid possible. It also proves favorable that the firing aid has a coefficient of thermal expansion of only 1 to $1.3 \times 10^{-6}$/K;
- is temperature stable even at the high firing temperatures. The viscosity of the firing aid, at 1080° C., is greater than $10^{13}$ dpas.

The firing aid can be realized with a smoothness on the diagonal of better than 1 mm per 1 m from the ideal smooth surface.

Because of the high temperature stability, it also makes it possible to fire high-quartz mixed crystal glass ceramic;
in contrast to cordierite, is partly permeable to IR radiation, which advantageously means that the product to be fired can be radiation-heated from below as well.

In terms of the method, the object is attained by a method for producing the firing aid having the following steps:
Furnishing a green glass body in the desired dimensions of the firing aid, and
Ceramicizing the green glass body with a keatite phase either directly or indirectly from a glass ceramic body, previously converted in the electric furnace from the green glass body, with a high-quartz mixed crystal phase, in a gas or electric furnace.

In Japanese Patent Disclosure JP 05-339021, a method for smoothing the surface waviness and improving the compaction of articles made of glass is described in which a glass wafer is thermally treated in an annealing furnace on a heat-resistant glass ceramic wafer that is especially smooth. The walls of the furnace likewise comprise a glass ceramic. As the glass ceramic, a glass ceramic with β quartz or β spodumen crystals is described.

As an advantage to using glass ceramic as a thermal treatment aid, the reference describes the avoidance of abrasion and of the formation of dust or corrosion particles, which could impair the surface of the glass wafer. However, the method described offers no instructions on avoiding the harmful interactions (adhesion) between the glass ceramic firing aid and a product being fired at the desired high temperatures of up to 1100° C.

The structure described in the reference involves only a discontinuous process. Nor are the nubs on the underside of the firing aid that are advantageous for economical use in a roller-type furnace described.

The known thermal treatment aid is therefore not usable in roller-type furnaces.

Setting or adjusting any particular surface condition that prevents the adhesion of the product to be fired resting on it is not possible, nor is there any mention of the possibility of also achieving support plates with a coefficient of thermal expansion of $1 \times 10^{-6}$/K and thus achieving an especially high spalling resistance (up to 800° C.)

In U.S. Pat. No. 4,187,115, the use of anorthite glass ceramics for such applications as firing aids is mentioned, but not described in detail.

The keatite glass ceramic support plate of the invention, as a result of special shaping, has nubs on the underside, which avert the usual usage injuries in shipping and handling and as a result protects the interstices, in which peak stresses occur upon loading, resulting in an improved long-term impact strength. In this respect it is especially important that the keatite glass ceramic does not develop surface cracks.

A suitable peripheral machining of the support plate assures the avoidance of peripheral injuries and long-term strength.

The aforementioned advantages are more or less apparent depending on the composition of the keatite glass ceramic used for the firing aid of the invention.

Thus in the temperature usage range given of up to about 1100° C., an LAS glass ceramic that is in the keatite phase proves to be suitable, because in contrast to conventional firing aids for high-temperature use, it has no porosity whatever.

The preferred embodiments of the support plate or firing aid have a glass ceramic composition, in percent by weight based on oxide content of:

| | |
|---|---|
| $Li_2O$ | 3.0–5.0, especially 3.5–4.0; |
| $Na_2O$ | 0–1.5, especially 0.4–0.7; |
| $K_2O$ | 0–1.0, especially 0–0.2; |
| $Na_2O + K_2O$ | 0.3–2.0, especially 0.4–0.8; |
| MgO | 0–1.5, especially 0.2–0.6; |
| CaO | 0–1.0, especially <0.1; |
| SrO | 0–2.0, especially <0.1; |
| BaO | 0–3.0, especially 1.5–2.5; |
| ZnO | 0–2.5, especially 1.0–2.0; |
| $Al_2O_3$ | 18–27, especially 20–23; |
| $B_2O_3$ | 0–3.0, <0.5; |
| $SiO_2$ | 54–70, especially 63–65; |
| $TiO_2$ | 1.0–5.0, especially 2.0–3.0; |
| $ZrO_2$ | 0–2.5, especially 1.0–2.0; |
| $TiO_2 + ZrO_2$ | 3.0–5.5, especially 3.5–5.0; |
| $P_2O_5$ | 0–8.0, especially 0–0.5; | and optionally at least one clarifying agent, such as $As_2O_3$, $Sb_2O_3$ and $SnO_2$, and optionally at least one coloring ingredient, such as a compound of V, Cr, Mn, Fe, Co, Cu, Ni, Se and Cl.

The most preferred embodiment of the support plate or firing aid contains 3.6 percent by weight of said $Li_2O$, 0.5 percent by weight of said $Na_2O$, 0.5 percent by weight of said MgO, 2.0 percent by weight of said BaO, 1.7 percent by weight of said ZnO, 22 percent by weight of said $Al_2O_3$, 64 percent by weight of said $SiO_2$, 2.3 percent by weight of said $TiO_2$, 1.6 percent by weight of said $ZrO_2$, and further comprising 1.5 percent by weight of $Sb_2O_3$ and 0.30 percent by weight of $V_2O_5$.

Surprisingly, glass ceramics having a composition with the preferred oxide concentration ranges set forth above do not exhibit the development of surface cracks, which is usual in other commercially available compositions (such as EUROKERA or NEG material) in a conversion at 1100° C. to 1200° C. for a period of 1 to 5 hours in keatite. The high conversion temperature is required to enable usage temperatures up to 1100° C. without changes in the keatite glass ceramic in its interior and/or on the surface from long-term temperature stress. The crack development at three conversion temperatures in the keatite glass ceramic material with the most preferred compositions given above is shown in Table 1 in comparison with EUROKEA (EK) material.

TABLE 1

| | Glass ceramic, most preferred embodiment | EK |
|---|---|---|
| 1060° C./2 h | Cracks Yes | Yes |
| 1100° C./2 h | Cracks No | Yes |
| 1140° C./2 h | Cracks No | Yes |

In the same way, keatite glass ceramic compositions with the preferred oxide concentration ranges set forth above offer the capability of achieving an especially low coefficient of thermal expansion and hence an especially high spalling resistance.

The composition of such glass ceramics has become known per se from European Patent Disclosure EP 0 220 333.

For special applications, the good surface properties of the keatite firing aid can also be used in a kind of "sandwich", by placing keatite plates only a few millimeters thick on other ceramic firing aids.

Below, the production of a platelike firing aid according to the invention, consisting of an LAS glass ceramic, will be described as an example.

The LAS glass ceramic is produced as in the prior art by a rolling shaping process with a nubby underside from a glass melt, in sizes up to 1600×900 mm² (or greater) with thicknesses between 3 mm and 8 mm. The plates are cut to size and given a special edge polishing (C shape) to eliminate injuries to the edges. The material is ceramicized either directly in a gas (rolling) furnace with a keatite phase, or it is first ceramicized in an electric (rolling) furnace with a high-quartz mixed crystal phase and then converted into keatite in a gas (rolling) furnace. By means of special tempering, that is, by means of the heating rate in the keatite range, the spalling resistance of the material can be adjusted.

As already noted, it proves to be a special advantage that the glass ceramic with the preferred oxide concentration ranges set forth above upon conversion exhibits no surface cracks in the keatite. The conversion to the keatite phase in the gas furnace has the effect that the otherwise glasslike surface layer is avoided, and the firing aid thus has better resistance to adhesive effects.

As described at the outset, the support plates of keatite glass ceramic according to the invention, despite slender dimensions, are mechanically quite stable.

The invention claimed is:

1. A support plate for transporting products during thermal treatment at firing temperatures, said products consisting of different materials, wherein said support plate has a nubby structure on an underside thereof and comprises a nonporous keatite glass ceramic without a glassy surface layer.

2. The support plate as defined in claim 1, having rounded edges.

3. The support plate as defined in claim 2, wherein said edges are C-shaped.

4. The support plate as defined in claim 1, wherein said keatite glass ceramic has a composition, in percent by weight based on oxide content, comprising:

| | |
|---|---|
| $Li_2O$ | 3.0–5.0 |
| $Na_2O$ | 0–1.5 |
| $K_2O$ | 0–1.5 |
| $Na_2O + K_2O$ | 0.3–2.0 |
| MgO | 0–1.5 |
| CaO | 0–1.0 |
| SrO | 0–2.0 |
| BaO | 0–3.0 |
| ZnO | 0–2.5 |
| $Al_2O_3$ | 18–27 |
| $B_2O_3$ | 0–3.0 |
| $SiO_2$ | 54–70 |
| $TiO_2$ | 1.0–5.0 |
| $ZrO_2$ | 0–2.5 |
| $TiO_2 + ZrO_2$ | 3.0–5.5 |
| $P_2O_5$ | 0–8.0 | and optionally at least one clarifying agent and optionally at least one coloring ingredient.

5. The support plate as defined in claim 4, wherein said at least one clarifying agent is selected from the group consisting of $As_2O_3$, $Sb_2O_3$ and $SnO_2$.

6. The support plate as defined in claim 4, wherein said at least one coloring ingredient comprises a color-imparting compound and said color-imparting compound contains at least one element selected from the group consisting of V, Cr, Mn, Fe, Co, Cu, Ni, Se and Cl.

7. The support plate as defined in claim 1, wherein said keatite glass ceramic has a compositions in percent by weight based on oxide content, comprising:

| | |
|---|---|
| $Li_2O$ | 3.5–4.0 |
| $Na_2O$ | 0.4–0.7 |
| $K_2O$ | 0–0.2 |
| $Na_2O + K_2O$ | 0.4–0.8 |
| MgO | 0.2–0.6 |
| CaO | <0.1 |
| SrO | <0.1 |
| BaO | 1.5–2.5 |
| ZnO | 1.0–2.0 |
| $B_2O_3$ | <0.5 |
| $Al_2O_3$ | 20–23 |
| $SiO_2$ | 63–65 |
| $TiO_2$ | 2.0–3.0 |
| $ZrO_2$ | 1.0–2.0 |
| $TiO_2 + ZrO_2$ | 3.5–5.0 |
| $P_2O_5$ | 0–0.5 | and optionally at least one clarifying agent and optionally at least one coloring ingredient.

8. The support plate as defined in claim 7, wherein said at least one clarifying agent is selected from the group consisting of $As_2O_3$, $Sb_2O_3$ and $SnO_2$.

9. The support plate as defined in claim 7, wherein said at least one coloring ingredient comprises a color-imparting compound and said color-imparting compound contains at least one element selected from the group consisting of V, Cr, Mn, Fe, Co, Cu, Ni, Se and Cl.

10. The support plate as defined in claim 4, containing 3.6 percent by weight of said $Li_2O$, 0.5 percent by weight of said $Na_2O$, 0.5 percent by weight of said MgO, 2.0 percent by weight of said BaO, 1.7 percent by weight of said ZnO, 22 percent by weight of said $Al_2O_3$, 64 percent by weight of said $SiO_2$, 2.3 percent by weight of said $TiO_2$, 1.6 percent by weight of said $ZrO_2$, and further comprising 1.5 percent by weight of $Sb_2O_3$ and 0.30 percent by weight of $V_2O_5$.

11. The support plate having a nubby structure on an underside thereof as defined in claim 4 or 7, wherein 1.5% by weight<$Na_2O+K_2O+CaO+SrO+BaO+B_2O_3$<5% by weight; and $SiO_2-(Na_2O+K_2O+CaO+SrO+BaO+B_2O_3)$<65% by weight.

12. A method of making a support plate for transporting products during thermal treatment at firing temperatures, said products consisting of different materials, wherein said support plate comprises a nonporous keatite glass ceramic without a glassy surface layer; said method comprising the steps of:

a) providing a green glass body with predetermined dimensions of the support plate; and b) ceramicizing said green glass body in a gas furnace or an electric furnace, either directly to form the nonporous keatite glass ceramic without a glassy surface layer or indirectly from a glass ceramic body with a high-quartz mixed crystal phase to form the nonporous keatite glass ceramic without a glassy surface layer, said glass ceramic body with the high quartz mixed crystal phase being previously prepared from said green glass body in the electric furnace.

13. The method as defined in claim 12, further comprising removing material from a surface of the keatite glass ceramic that receives said products to be fired.

14. A method of transporting products during thermal treatment of the products at firing temperatures up to 1100° C., said method comprising the steps of:

a) providing at least one supporting member having a nubby structure on an underside thereof and consisting of a nonporous keatite glass ceramic without a glassy surface layer; and b) transporting said products on said at least one supporting member while heat treating said products at said firing temperatures up to 1100° C.

15. The method as defined in claim 14, wherein said keatite glass ceramic has a composition, in percent by weight based on oxide content, comprising:

| | |
|---|---|
| $Li_2O$ | 3.0–5.0 |
| $Na_2O$ | 0–1.5 |
| $K_2O$ | 0–1.0 |
| $Na_2O + K_2O$ | 0.3–2.0 |
| MgO | 0–1.5 |
| CaO | 0–1.0 |
| SrO | 0–2.0 |
| BaO | 0–3.0 |
| ZnO | 0–2.5 |
| $Al_2O_3$ | 18–27 |
| $B_2O_3$ | 0–3.0 |
| $SiO_2$ | 54–70 |
| $TiO_2$ | 1.0–5.0 |
| $ZrO_2$ | 0–2.5 |
| $TiO_2 + ZrO_2$ | 3.0–5.5 |
| $P_2O_5$ | 0–8.0 | and optionally at least one clarifying agent and optionally at least one coloring ingredient.

16. A method of making a support plate having a nubby structure on an underside thereof for transporting products during thermal treatment at firing temperatures, said products consisting of different materials, wherein said support plate comprises a nonporous keatite glass ceramic without a glassy surface layer; said method comprising the steps of:

a) providing a green glass body with predetermined dimensions of the support plate:

b) ceramicizing said green glass body in a gas furnace or an electric furnace, either directly to form the nonporous keatite glass ceramic or indirectly from a glass ceramic body with a high-quartz mixed crystal phase to form the nonporous keatite glass ceramic, said glass ceramic body with the high quartz mixed crystal phase being previously prepared from said green glass body in the electric furnace; and c) removing material from a surface of the keatite glass ceramic that receives said products to be fired.

* * * * *